US011305714B2

(12) United States Patent
Tokizaki et al.

(10) Patent No.: US 11,305,714 B2
(45) Date of Patent: Apr. 19, 2022

(54) VEHICLE OCCUPANT PROTECTION SYSTEM

(71) Applicant: SUBARU CORPORATION, Tokyo (JP)

(72) Inventors: Junpei Tokizaki, Tokyo (JP); Ryota Nakamura, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 49 days.

(21) Appl. No.: 16/854,286

(22) Filed: Apr. 21, 2020

(65) Prior Publication Data

US 2021/0016737 A1    Jan. 21, 2021

(30) Foreign Application Priority Data

Jul. 16, 2019    (JP) .............................. JP2019-131020

(51) Int. Cl.
*B60R 21/015* (2006.01)
*B60R 21/0134* (2006.01)
*B60R 21/01* (2006.01)

(52) U.S. Cl.
CPC .... *B60R 21/01538* (2014.10); *B60R 21/0134* (2013.01); *B60R 2021/01013* (2013.01)

(58) Field of Classification Search
CPC ...................... B60R 21/01538; B60R 21/0153
See application file for complete search history.

(56) References Cited

U.S. PATENT DOCUMENTS

| 8,059,867 B2* | 11/2011 | Aoki ...................... G06K 9/209 |
| | | 382/104 |
| 2008/0080741 A1* | 4/2008 | Yokoo ............... B60R 21/01538 |
| | | 382/104 |
| 2018/0147955 A1* | 5/2018 | Fujii ....................... B60N 2/002 |

(Continued)

FOREIGN PATENT DOCUMENTS

| JP | 11-043009 A | 2/1999 |
| JP | 2000172965 A | * 6/2000 |
| WO | WO-2019180876 A1 | * 9/2019 ............... A61B 5/18 |

OTHER PUBLICATIONS

Iwamoto et al., Alarm System for Vehicle, EPO, JP 2000-172965 A, Machine Translation of Description (Year: 2000).*

(Continued)

*Primary Examiner* — James A English
(74) *Attorney, Agent, or Firm* — Troutman Pepper Hamilton Sanders LLP (57) ABSTRACT

A vehicle occupant protection system includes an imaging device, an occupant monitoring apparatus, and an occupant protection apparatus. The imaging device is configured to capture an image of an occupant riding in a vehicle. The occupant monitoring apparatus is configured to monitor the occupant on the basis of the captured image outputted from the imaging device, and configured to, in a case where a riding state of the occupant in the vehicle is undeterminable on the basis of the captured image outputted from the imaging device, switch an imaging range of the captured image to be outputted from the imaging device. The occupant protection apparatus is configured to execute, on the basis of the monitoring by the occupant monitoring apparatus, protection control that is based on the occupant riding in the vehicle.

13 Claims, 8 Drawing Sheets

(56) References Cited

U.S. PATENT DOCUMENTS

| | | | |
|---|---|---|---|
| 2020/0094726 A1* | 3/2020 | McCluskey | B60P 1/43 |
| 2020/0097744 A1* | 3/2020 | Nakamura | B60R 21/01538 |
| 2021/0001796 A1* | 1/2021 | Kudo | B60R 21/01556 |
| 2021/0146962 A1* | 5/2021 | Kaji | B60W 60/0051 |

OTHER PUBLICATIONS

Iwamoto et al., Alarm System for Vehicle, EPO, JP 2000-172965 A, English Abstract (Year: 2000).*

* cited by examiner

COLLISION PREDICTION INFORMATION

| IMPACT | | VEHICLE SPEED |
|---|---|---|
| APPLICATION POSITION | INTENSITY | |
| MIDDLE OF FRONT PART | STRONG | HIGH |
| SIDES OF FRONT PART | MEDIUM | MEDIUM |
| DIAGONALLY FORWARD RIGHT | WEAK | LOW |
| DIAGONALLY FORWARD LEFT | VERY WEAK | |
| RIGHT SIDE | | |
| LEFT SIDE | ⁝ | ⁝ |
| REAR | | |
| ⁝ | | |

FIG. 3B

OCCUPANT INFORMATION

| POSITION OF UPPER BODY | ORIENTATION OF UPPER BODY | POSITION OF HEAD | ORIENTATION OF HEAD |
|---|---|---|---|
| MIDDLE | FRONT | MIDDLE | FRONT |
| CLOSER TO RIGHT | DIAGONALLY FORWARD RIGHT | CLOSER TO RIGHT | DIAGONALLY FORWARD RIGHT |
| CLOSER TO LEFT | DIAGONALLY FORWARD LEFT | CLOSER TO LEFT | DIAGONALLY FORWARD LEFT |
| | | | RIGHT SIDE |
| | | | LEFT SIDE |
| ⁂ | ⁂ | ⁂ | ⁂ |

VEHICLE OCCUPANT PROTECTION SYSTEM

CROSS-REFERENCE TO RELATED APPLICATIONS

The present application claims priority from Japanese Patent Application No. 2019-131020 filed on Jul. 16, 2019, the entire contents of which are hereby incorporated by reference.

BACKGROUND

The technology relates to a vehicle occupant protection system.

A vehicle is provided with an occupant protection apparatus that executes protection control for an occupant riding in the vehicle upon collision, for example. Upon detection of impact due to the collision, the occupant protection apparatus may restrain the occupant seated in a seat with a seatbelt, or deploy an airbag around the seat to absorb impact to the occupant that falls or comes away from the seat.

SUMMARY

An aspect of the technology provides a vehicle occupant protection system including an imaging device, an occupant monitoring apparatus, and an occupant protection apparatus. The imaging device is configured to capture an image of an occupant riding in a vehicle. The occupant monitoring apparatus is configured to monitor the occupant on the basis of the captured image outputted from the imaging device, and configured to, in a case where a riding state of the occupant in the vehicle is undeterminable on the basis of the captured image outputted from the imaging device, switch an imaging range of the captured image to be outputted from the imaging device. The occupant protection apparatus is configured to execute, on the basis of the monitoring by the occupant monitoring apparatus, protection control that is based on the occupant riding in the vehicle.

BRIEF DESCRIPTION OF THE DRAWINGS

The accompanying drawings are included to provide a further understanding of the disclosure and are incorporated in and constitute a part of this specification. The drawings illustrate example embodiments and, together with the specification, serve to explain the principles of the technology.

DETAILED DESCRIPTION

Collision of a vehicle is, for example, not limited to front collision or side collision. For example, another mobile body can collide with a side surface of the vehicle, or another mobile body can collide with the vehicle diagonally from the front.

It is therefore demanded that an occupant protection apparatus be adaptable to as wide a variety of collision types as possible. It is also demanded that the occupant protection apparatus be able to perform occupant protection as suitable as possible for a riding state of an occupant at the time of collision.

In Japanese Unexamined Patent Application Publication No. H11-043009, the vehicle is provided with an imaging device, such as a CCD device, to monitor an occupant riding in a vehicle. Such an imaging device may be used for occupant protection.

It is desirable to make it possible in a vehicle to execute protection control corresponding to an occupant that appears in a captured image outputted from an imaging device.

In the following, some example embodiments of the technology are described with reference to the accompanying drawings. Note that the following description is directed to illustrative examples of the disclosure and not to be construed as limiting to the technology. In each of the drawings referred to in the following description, elements have different scales in order to illustrate the respective elements with sizes recognizable in the drawings. Therefore, factors including, without limitation, the number of each of the elements, the shape of each of the elements, a size of each of the elements, a ratio between the elements, and relative positional relationship between the elements are illustrative only and not to be construed as limiting to the technology. Further, elements in the following example embodiments which are not recited in a most-generic independent claim of the disclosure are optional and may be provided on an as-needed basis. Throughout the present specification and the drawings, elements having substantially the same function and configuration are denoted with the same numerals to avoid any redundant description.

Figure 1:
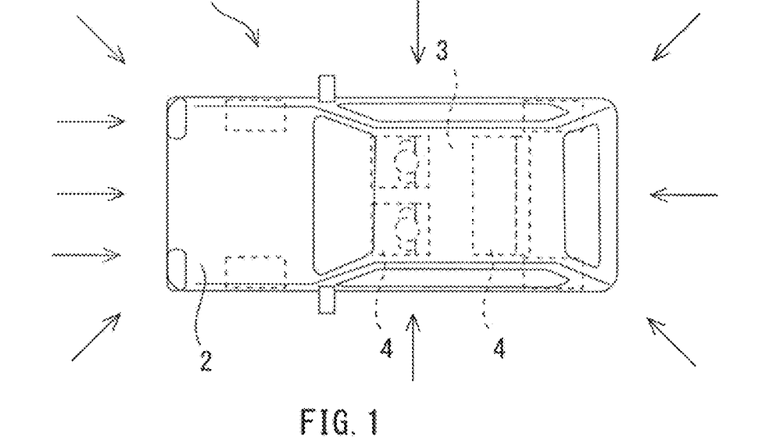
FIG. 1 is an explanatory diagram illustrating an automobile according to one example embodiment of the technology.

FIG. 1 is an explanatory diagram illustrating an automobile 1 according to an example embodiment of the technology. The automobile 1 is an example of a vehicle.

The automobile 1 illustrated in FIG. 1 may have a body 2 that is provided with a cabin 3 in which a plurality of occupants including a driver rides. The occupants riding in the automobile 1 may be seated in seats 4 provided in the cabin 3. In this state, the automobile 1 may travel and move by the driver operating an operating device 39, such as a steering wheel, a pedal, or a lever, of the automobile 1. Alternatively, the automobile 1 may travel and move by autonomous automated driving on the basis of setting of a destination, for example.

While moving or being at a stop, the automobile 1 as described above can come into contact with or collide with another mobile body such as another automobile 1. As indicated by a plurality of arrows in FIG. 1, the automobile 1 may receive impact due to collision with the other mobile body from any direction such as a longitudinal direction, a lateral direction, or a diagonal direction. In this case, upper bodies of the occupants seated in the seats 4 may basically fall toward an application direction of the impact.

Figure 2:
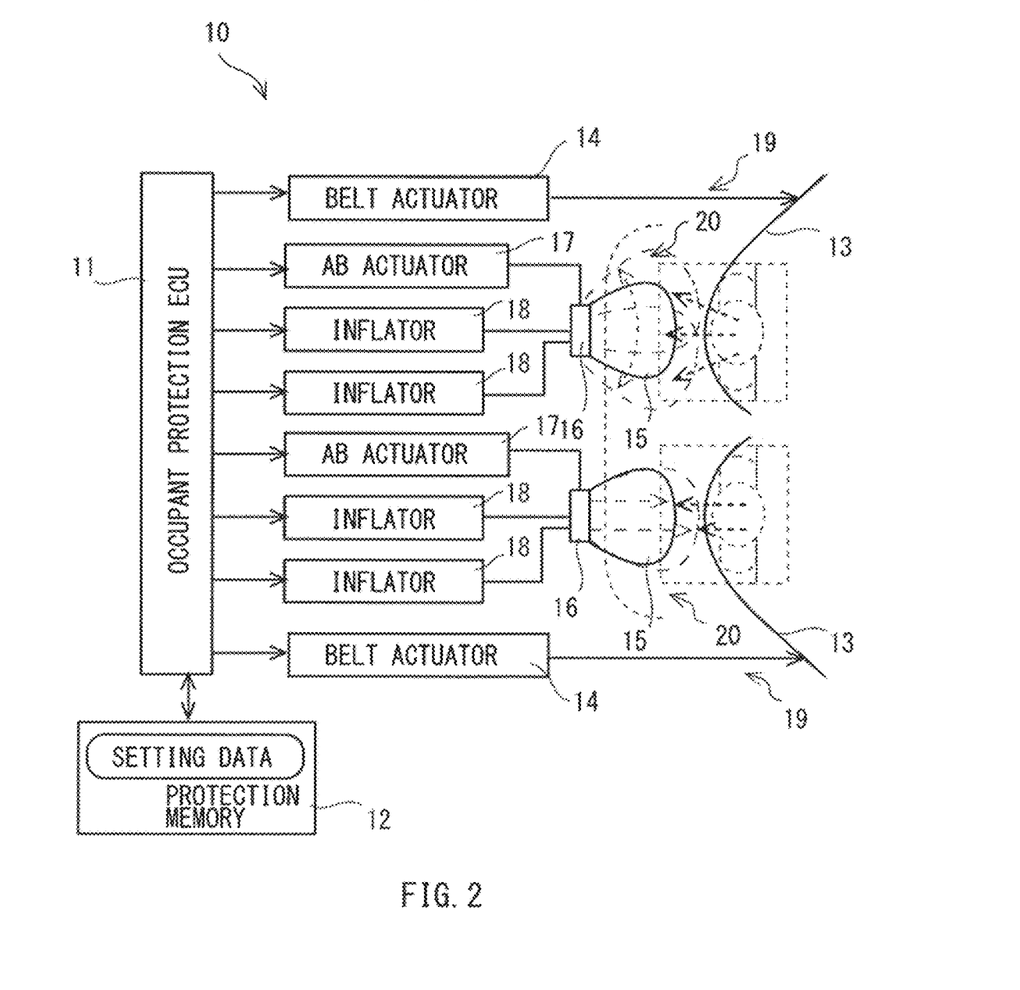
FIG. 2 is a schematic diagram illustrating an example of an occupant protection apparatus that is provided in the automobile illustrated in FIG. 1.

FIG. 2 is a schematic diagram illustrating an example of an occupant protection apparatus 10 that is provided in the automobile 1 illustrated in FIG. 1.

The occupant protection apparatus 10 illustrated in FIG. 2 may include an occupant protection ECU 11, a protection memory 12, a plurality of seatbelts 13, a plurality of belt actuators 14, a plurality of airbags 15, a plurality of base members 16, a plurality of airbag actuators (AB actuators) 17, and a plurality of inflators 18.

One set of the seatbelt 13 and the belt actuator 14 may configure one seatbelt member 19.

One set of the airbag 15, the base member 16, the airbag actuator 17, and the inflators 18 may configure one airbag member 20.

The seatbelt member 19 and the airbag member 20 may be provided for each of the seats 4, or for each of seating positions of the seats 4. In FIG. 2, two sets of the seatbelt members 19 and two sets of the airbag members 20 may be provided to correspond to a left and right pair of seats 4.

The seatbelt 13 may be a belt to be stretched over a waist and the upper body of the occupant seated in the seat 4.

The belt actuator 14 may apply variable tension to the seatbelt 13. The seatbelt 13 applied with the tension may serve to press the waist and the upper body of the occupant against the seat 4.

The airbag 15 may be a bag that is deployed instantaneously by high-pressure gas.

The inflators 18 may each generate the high-pressure gas to be injected into the airbag 15. In a case where all the inflators 18 are operated, the airbag 15 may be deployed at high pressure. In a case where at least one of the inflators 18 is operated, the airbag 15 may be deployed at low pressure. Shifting operation start timings of the inflators 18 from each other makes it possible to deploy the airbag 15 under a pressure change different from that in case where the operation start timings match each other.

The base member 16, to which the airbag 15 is attached, may fold and accommodate the airbag 15. It is to be noted that the base member 16 may be provided with the inflators 18 as well.

The airbag actuator 17 may drive the base member 16 to adjust a position or an orientation of the base member 16. In a case where the base member 16 is attached to the body 2 to be movable in a vehicle width direction, a longitudinal direction, and a vertical direction, for example, the airbag actuator 17 may slide the base member 16 to adjust its position.

In a case where the base member 16 is provided to be rotatable at an attachment position, the airbag actuator 17 may rotate the base member 16 to adjust its orientation.

The protection memory 12 may be a semiconductor memory, for example. The protection memory 12 may record a program for occupant protection and setting data, for example.

The occupant protection ECU 11 may be a microcomputer, for example. The occupant protection ECU 11 may read and execute a program recorded in the protection memory 12. Thus, the occupant protection ECU 11 may serve as an occupant protection controller.

The occupant protection ECU 11 serving as the occupant protection controller may execute occupant protection control upon prediction of collision of the automobile 1 or upon detection of collision of the automobile 1. The occupant protection ECU 11 may execute the occupant protection control on the basis of the detection of the collision of the automobile 1 or detection of unavoidability of the collision. At that occasion, the occupant protection ECU 11 may execute protection control corresponding to the occupant riding in the automobile 1 on the basis of, for example, an application position and intensity of impact as illustrated in FIG. 1, a vehicle speed, and positions and orientations of the upper body and a head of the occupant seated in the seat 4. For example, to protect the occupant, the occupant protection ECU 11 may deploy the airbag 15 in a direction in which the upper body of the occupant falls. The occupant protection ECU 11 may apply tension corresponding to the intensity of the impact to the seatbelt 13 of the seatbelt member 19. This enables the seatbelt 13 to support the upper body of the occupant that falls upon the collision, and the deployed airbag to absorb the impact to the upper body of the occupant that still falls.

By executing such control, it is possible for the occupant protection apparatus 10 to execute optimum occupant protection suitable for a riding state of the occupant at the time of collision, in accordance with a wide variety of collision types.

Figure 3A:
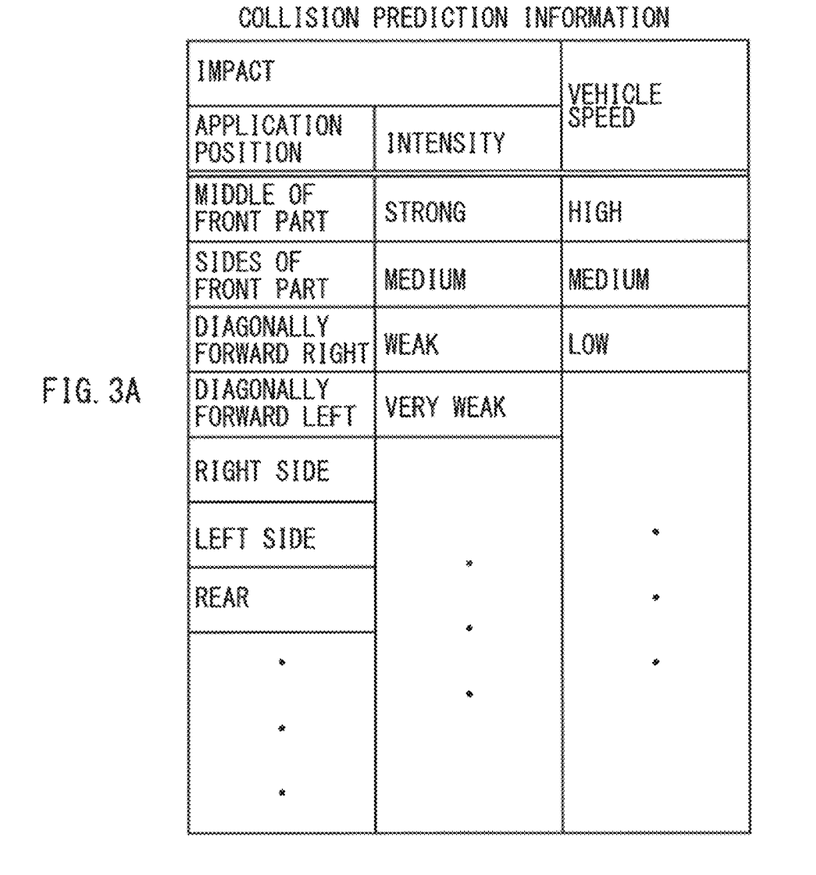
FIGS. 3A and 3B are explanatory diagrams each illustrating an example of information to be used by the occupant protection apparatus illustrated in FIG. 2 for optimum protection control corresponding to a riding state of an occupant, for example.
Figure 3B:
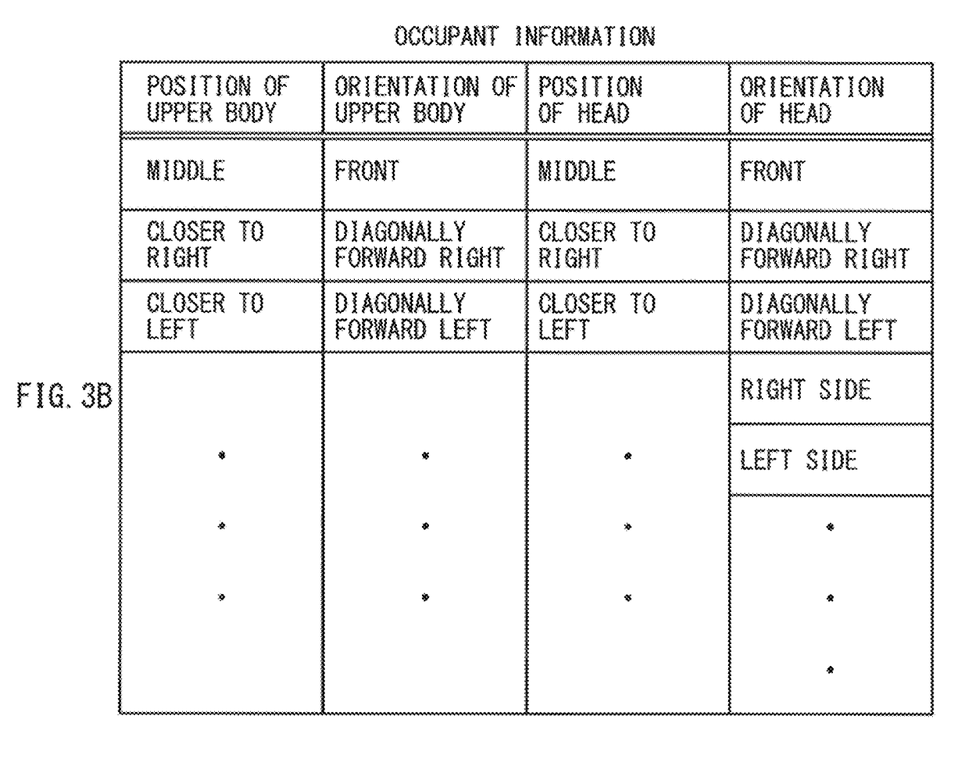

FIGS. 3A and 3B are explanatory diagrams each illustrating an example of information to be used by the occupant protection apparatus 10 illustrated in FIG. 2 for optimum protection control corresponding to the riding state of the occupant, for example.

FIG. 3A illustrates collision prediction information. The collision prediction information in FIG. 3A may include the application position of the impact, the intensity of the impact, and the vehicle speed. Prediction information of the application position and the intensity of the impact is predictable on the basis of, for example, relative movement between the automobile 1 and another mobile body whose image is captured by a vehicle exterior imaging device 47. The vehicle speed of the own vehicle may be detected by a speed sensor 45.

FIG. 3B illustrates occupant information. The occupant information in FIG. 3B may include the position (seating position) of the upper body, the orientation of the upper body, the position of the head, and the orientation of the head, for example, of the occupant such as the driver. These pieces of information may be generated by an occupant monitoring apparatus 33 that monitors the occupant on the basis of a captured image of the occupant riding in the automobile 1.

In a case where these pieces of information are acquirable, it is possible for the occupant protection ECU 11 to execute optimum occupant protection suitable for the riding state of the occupant at the time of collision, in accordance with a wide variety of collision types.

In contrast, in a case where at least some of these pieces of information are not acquirable, the occupant protection ECU 11 may execute normal occupant protection corresponding to a collision type alone and not considering the riding state of the occupant at the time of the collision, for example. Such normal occupant protection is not always optimum protection corresponding to the riding state of the occupant, and can be one-size-fits-all protection.

As described above, for the occupant protection apparatus 10 to execute advanced occupant protection, information detected with high accuracy regarding a seating state of the occupant at the time of the collision may be desired, for example, as well as information of the application position and the intensity of the impact to the body 2.

Figure 4:
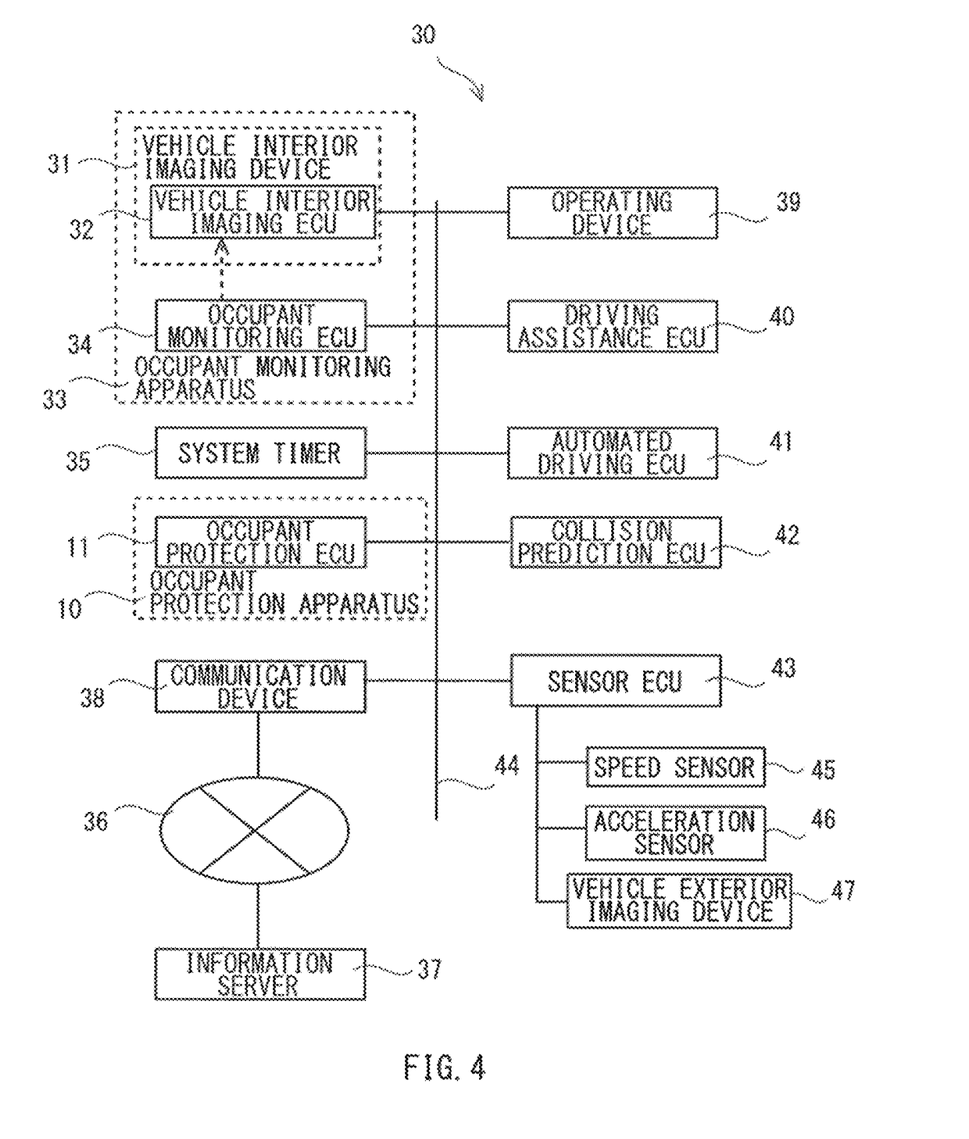
FIG. 4 is a schematic diagram illustrating an example of a control system that is provided in the automobile illustrated in FIG. 1.

FIG. 4 is a schematic diagram illustrating an example of a control system 30 that is provided in the automobile 1 illustrated in FIG. 1.

The control system 30 illustrated in FIG. 4 may include a vehicle interior imaging ECU 32 of a vehicle interior imaging device 31, an occupant monitoring ECU 34 of the occupant monitoring apparatus 33, a system timer 35, the occupant protection ECU 11 of the occupant protection apparatus 10, a communication device 38, the operating device 39, a driving assistance ECU 40, an automated driving ECU 41, a collision prediction ECU 42, a sensor ECU 43, and an in-vehicle network 44 to which these elements are coupled. The communication device 38 may communicate with an information server 37 through a wireless communication network 36.

The in-vehicle network 44 may be, for example, a data communication network for vehicles that is based on a standard such as CAN.

The system timer 35 may measure a time and a time period. The system timer 35 may output data of the measured time or elapsed time to the in-vehicle network 44.

To the sensor ECU 43 may be coupled, for example, the speed sensor 45, an acceleration sensor 46, and the vehicle exterior imaging device 47. The sensor ECU 43 may control operation of these sensors, and output, to the in-vehicle network 44, information such as a captured image of the vehicle exterior detected by the vehicle exterior imaging device 47, and acceleration of the automobile 1 detected by the acceleration sensor 46.

On the basis of the captured image of the vehicle exterior and the vehicle speed, for example, the collision prediction ECU 42 may predict collision of the automobile 1. The collision prediction ECU 42 may output collision prediction data to the in-vehicle network 44.

The communication device 38 may wirelessly communicate with a base station (not illustrated), and transmit and receive data to and from the information server 37 through the wireless communication network 36. The communication device 38 may acquire map data and traffic information, for example, from the information server 37.

The operating device 39 may be an operating device that is provided in the body 2 to be operated by the occupant. The operating device 39 may include, for example, a steering wheel, an accelerator pedal, a brake pedal, and a shift lever.

The driving assistance ECU 40 may acquire operation data that is generated by the operating device 39 in response to an operation by the occupant, and generate travel control data corresponding to the operation data. The driving assistance ECU 40 may output the travel control data, through the in-vehicle network 44, to a driving source ECU that controls operation of an engine (not illustrated), a braking ECU that controls a braking device (not illustrated), and a steering ECU that controls a steering device (not illustrated). The automobile 1 may thus travel and move in response to the operation by the occupant.

The automated driving ECU 41 may cause the automobile 1 to travel to the destination, on the basis of route setting to the destination, for example. The automated driving ECU 41 may generate travel control data to control movement of the automobile 1, depending on a travel environment of a road on which the automobile 1 travels. The automated driving ECU 41 may output the travel control data, through the in-vehicle network 44, to the driving source ECU, the braking ECU, and the steering ECU described above. The automobile 1 may thus autonomously travel and move to the destination, regardless of an operation by the occupant.

The vehicle interior imaging ECU 32 may control operation of the vehicle interior imaging device 31 to capture an image of the occupant riding in the automobile 1. The vehicle interior imaging ECU 32 may output the image captured by the vehicle interior imaging device 31 to the in-vehicle network 44.

In one embodiment, the vehicle interior imaging device 31 may serve as an "imaging device".

The occupant monitoring ECU 34 may control operation of the occupant monitoring apparatus 33. The occupant monitoring ECU 34 may output setting data for imaging to the vehicle interior imaging ECU 32 through the in-vehicle network 44, for example. The occupant monitoring ECU 34 may acquire the captured image outputted from the vehicle interior imaging device 31, and monitor the occupant riding in the automobile 1 on the basis of the acquired captured image. In a case where collision of the automobile 1 is predicted, the occupant monitoring ECU 34 may output the riding state of the occupant to the in-vehicle network 44.

The occupant protection ECU 11 may control operation of the occupant protection apparatus 10. The occupant protection ECU 11 may execute control of protecting the occupant, for example, in a case where collision of the automobile 1 is predicted and, furthermore, in a case where acceleration due to the collision of the automobile 1 is detected by the acceleration sensor 46. The occupant protection ECU 11 may execute final control to protect the occupant, on the basis of detection of the collision of the automobile 1 or detection of unavoidability of the collision. In a case where sufficient information including a monitoring result of the occupant monitoring apparatus 33 is obtainable as information at the time of the collision, the occupant protection ECU 11 may execute optimum occupant protection corresponding to the riding state of the occupant at the time of the collision, in accordance with a wide variety of collision types. In a case where sufficient information is unobtainable as information at the time of the collision, the occupant protection ECU 11 may execute normal occupant protection not considering the riding state of the occupant.

Figure 5:
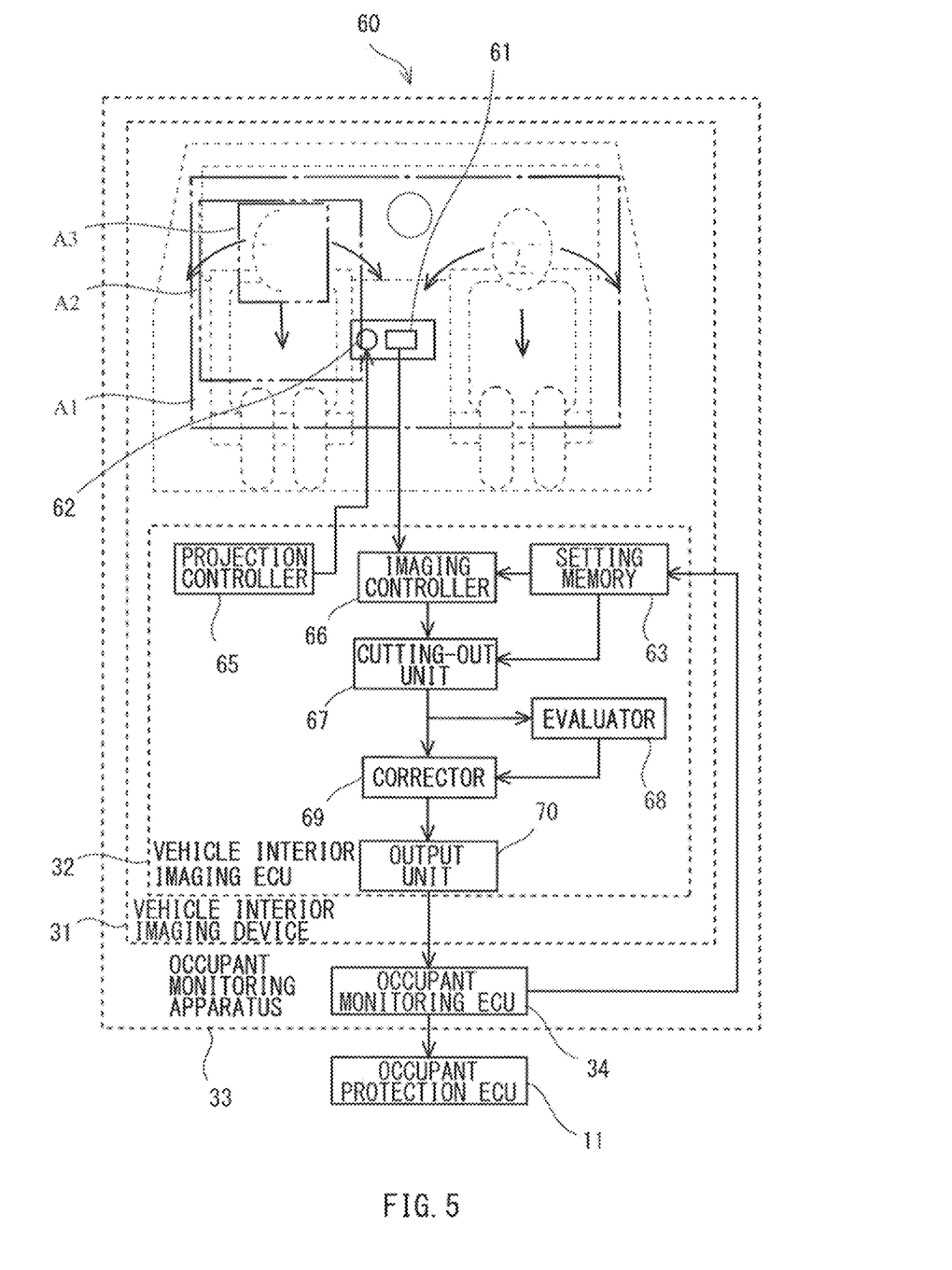
FIG. 5 is a main schematic diagram illustrating an occupant protection system that includes a vehicle interior imaging device and an occupant monitoring apparatus illustrated in FIG. 4.

FIG. 5 is a main schematic diagram illustrating an occupant protection system 60 that includes the vehicle interior imaging device 31 and the occupant monitoring apparatus 33 illustrated in FIG. 4.

The occupant protection system 60 illustrated in FIG. 5 may include the occupant monitoring apparatus 33 including the vehicle interior imaging device 31, and the occupant protection ECU 11.

The vehicle interior imaging device 31 may include an image sensor 61, a light emitter 62, and the vehicle interior imaging ECU 32 to which the image sensor 61 and the light emitter 62 are coupled.

The image sensor 61 and the light emitter 62 may be provided rearward, for example, in the middle of a front part of the cabin 3. For example, the image sensor 61 and the light emitter 62 may be provided rearward in the middle of a dashboard. The image sensor 61 and the light emitter 62 may be installed to be able to be detached from the body 2 when not in use. The image sensor 61 may basically have an angle of view that makes it possible to capture an image of the pair of seats 4 arranged in the vehicle width direction in the cabin 3 and the occupants seated in the seats 4. This enables the image sensor 61 to capture an image of the occupants riding in the automobile 1.

Here, a range of an angle of view in capturing an image of the entire bodies of the occupants may be referred to as a normal imaging range A1. The normal imaging range A1 may be, for example, a range of an angle of view in capturing an image of the entire body of any occupant such as the driver. A captured image of the normal imaging range A1 may be referred to as a normal captured image. Moreover, a range of an angle of view in capturing an image of an upper body and a head of the driver may be referred to as an upper body imaging range A2. The upper body imaging range A2 may be a portion of the normal imaging range A1. A captured image of the upper body imaging range A2 may be referred to as a captured upper body image. Moreover, a range of an angle of view in capturing an image of the head of the driver may be referred to as a head imaging range A3. The head imaging range A3 may be a portion of the upper body imaging range A2. A captured image of the head imaging range A3 may be referred to as a captured head image. The light emitter 62 may irradiate, with infrared light, for example, heads of the occupants to be subjected to imaging.

In one embodiment, the normal captured image may serve as a "first captured image", and the normal imaging range A1 may serve as a "first imaging range".

In one embodiment, the captured upper body image may serve as a "second captured image", and the upper body imaging range A2 may serve as a "second imaging range".

In one embodiment, the captured head image may serve as a "third captured image", and the head imaging range A3 may serve as a "third imaging range".

The vehicle interior imaging ECU 32 may include a setting memory 63. A program and setting data may be recorded in the setting memory 63. For example, setting data of an output frame rate of captured images, and setting data of an imaging range may be recorded in the setting memory 63. The setting data may be changed on the basis of an instruction from the occupant monitoring ECU 34.

The vehicle interior imaging ECU 32 may read and execute the program in the setting memory 63. Thus, the vehicle interior imaging ECU 32 may implement, as a vehicle interior imaging controller, a projection controller 65, an imaging controller 66, a cutting-out unit 67, an evaluator 68, a corrector 69, and an output unit 70, for example.

The projection controller 65 may control projection by the light emitter 62. For example, in a case where collision is predicted, the projection controller 65 may cause the light emitter 62 to project light at a maximum light quantity until determination of collision avoidance is made.

The imaging controller 66 may control imaging by the image sensor 61, on the basis of the setting in the setting memory 63. The imaging controller 66 may cause the image sensor 61 to perform imaging at a set imaging frame rate.

The cutting-out unit 67 may cut out an image of a designated range from a captured image of the image sensor 61, on the basis of the setting in the setting memory 63. Thus, a captured image of an imaging range may be generated. In a case of the captured image of the normal imaging range A1, the cutting-out unit 67 may treat the captured image of the image sensor 61 as it is as the captured image of the imaging range.

In one embodiment, the cutting-out unit 67 may serve as a "generator". In regard to the captured image generated by the cutting-out unit 67, the evaluator 68 may evaluate image quality, such as exposure. The evaluator 68 may calculate an average of pixel values of the entire captured image, and generate the average value as an evaluation value.

On the basis of the evaluation value of the evaluator 68, the corrector 69 may correct the image quality of the captured image of the imaging range generated by the cutting-out unit 67. For example, on the basis of the evaluation value of the exposure of the entire image by the evaluator 68, the corrector 69 may correct the pixel values of the entire captured image to allow average exposure of the entire image to satisfy predetermined brightness. Thus, the captured image of the imaging range may become an image with exposure (brightness) that is easy to use in subsequent processes.

The output unit 70 may output the captured image of the imaging range that has been corrected by the corrector 69 to the occupant monitoring ECU 34, for example, through the in-vehicle network 44.

Thus, from the output unit 70 of the vehicle interior imaging device 31, the captured image of the imaging range designated by the occupant monitoring ECU 34 may be outputted at each output frame rate designated by the occupant monitoring ECU 34.

Figure 6:
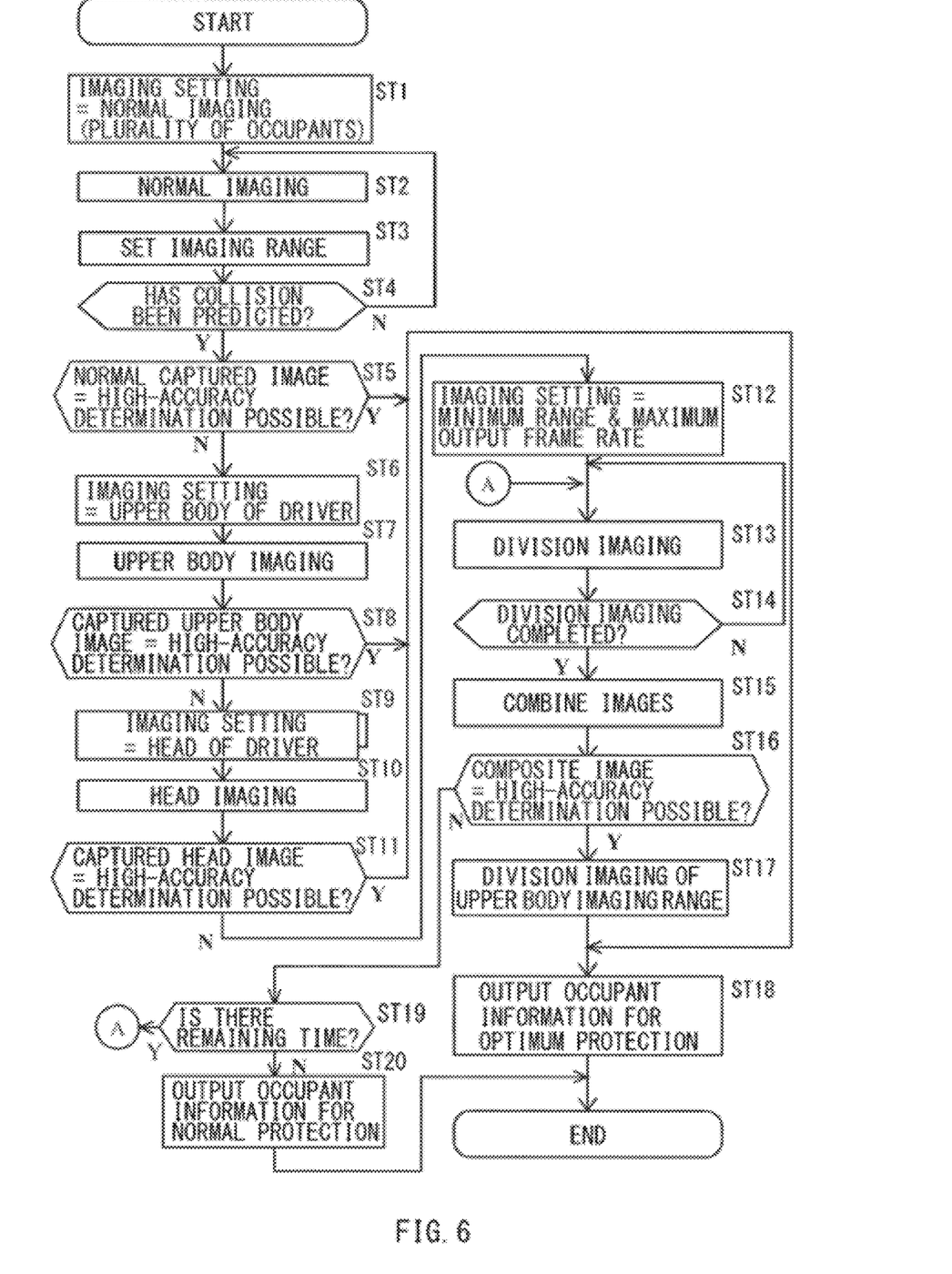
FIG. 6 is a flowchart illustrating imaging control by an occupant monitoring ECU illustrated in FIG. 4.

FIG. 6 is a flowchart illustrating imaging control by the occupant monitoring ECU 34 illustrated in FIG. 4.

Upon startup of the in-vehicle network 44 of the automobile 1, for example, the occupant monitoring ECU 34 may start a process illustrated in FIG. 6. The occupant monitoring ECU 34 may continue execution of the process illustrated in FIG. 6 until the in-vehicle network 44 of the automobile 1 stops, for example.

In step ST1, the occupant monitoring ECU 34 may set, in the setting memory 63, imaging in the normal imaging range A1 serving as the first imaging range. Thus, the vehicle interior imaging device 31 may output the captured image of the normal imaging range A1 that is obtained by performing imaging on the entire bodies of the occupants riding in the automobile 1. The vehicle interior imaging device 31 may output, at a normal frame rate, the captured image of the normal imaging range A1 derived from all pixels of the image sensor 61.

In step ST2, the occupant monitoring ECU 34 may acquire the captured image of the normal imaging range A1 outputted from the vehicle interior imaging device 31. The occupant monitoring ECU 34 may also extract, from the captured image of the normal imaging range A1, the upper body and the head of the driver riding in the automobile 1. On the basis of imaging positions and ranges, for example, of the upper body and the head in the normal imaging range A1, the occupant monitoring ECU 34 may determine a position and an orientation of the upper body and a position and an orientation of the head of the driver in the cabin 3.

In step ST3, the occupant monitoring ECU 34 may output, to the vehicle interior imaging device 31 through the in-vehicle network 44, information of the imaging range of the upper body and the head of the driver and information of the imaging range of the head alone, which have been determined in step ST2. The vehicle interior imaging ECU 32 may record the acquired imaging range of the upper body and the head of the driver in the setting memory 63, as the upper body imaging range A2. The vehicle interior imaging ECU 32 may record the acquired imaging range of the head alone of the driver in the setting memory 63, as the head imaging range A3. In subsequent processes, the vehicle interior imaging ECU 32 may use the updated upper body imaging range A2 and head imaging range A3.

In step ST4, the occupant monitoring ECU 34 may determine whether collision of the automobile 1 has been predicted. The collision prediction ECU 42 may determine the possibility of collision of the own vehicle, on the basis of an image of the vehicle exterior imaging device 47 or information of the communication device 38, for example. In a case where there is a possibility of collision of the own vehicle, the collision prediction ECU 42 may output information of collision prediction to the in-vehicle network 44. In a case where there is information of collision prediction, the occupant monitoring ECU 34 may determine that collision of the automobile 1 has been predicted (step ST4: Y), and advance the process to step ST5. Otherwise, the occupant monitoring ECU 34 may determine that collision of the automobile 1 has not been predicted (step ST4: N), and return the process to step ST2. Until collision is predicted, the occupant monitoring ECU 34 may repeat the processes from step ST2 to step ST4, and keep updating the upper body imaging range A2 and the head imaging range A3 recorded in the setting memory 63 on the basis of the latest normal captured image.

In step ST5, the occupant monitoring ECU 34 may determine whether the positions and the orientations of the upper body and the head of the driver are determinable with high accuracy on the basis of the latest normal captured image.

An imaging environment for the driver may greatly change every moment depending on, for example, the travel environment of the automobile 1. For example, in a case where sunset or sunrise appears in the normal captured image as illustrated in FIG. 5, the vehicle exterior is bright, and adjustment of the image quality, such as the exposure, makes the vehicle interior relatively dark. In this case, the upper body and the head of the driver also appears relatively dark in the captured image. As another example, in a case where the head or the upper body of the driver is irradiated with strong light, such as sunlight or a high-beam of another automobile 1, the irradiated portion sometimes does not appear clearly in the image, even if the image quality, such as the exposure, is adjusted. In such a case where the upper body and the head of the driver do not appear clearly in the image, it is difficult to determine the positions and the orientations of the upper body and the head of the driver with high accuracy.

Accordingly, the occupant monitoring ECU 34 may perform edge detection on the latest normal captured image, for example, and attempt to extract predetermined features, e.g., an outline of a face, an eye, a nose, a mouth, and a shoulder, in the image of the normal imaging range A1 after the edge detection. In a case where the head is clearly visible in the image, it is possible to extract predetermined features of the face in the image after the edge detection. In this case, the occupant monitoring ECU 34 may determine that the positions and the orientations of the upper body and the head of the driver are determinable with high accuracy (step ST5: Y), and advance the process to step ST18. In a case where the positions and the orientations are not determinable with high accuracy (step ST5: N), the occupant monitoring ECU 34 may advance the process to step ST6.

In step ST6, the occupant monitoring ECU 34 may set, in the setting memory 63, imaging in the upper body imaging range A2 serving as the second imaging range. Thus, the vehicle interior imaging device 31 may start to output the captured image of the upper body imaging range A2 that is obtained by performing imaging on the entire upper body, including the head, of the driver riding in the automobile 1. The vehicle interior imaging device 31 may start to output, at the normal frame rate, the captured image of the upper body imaging range A2 derived from some of the pixels of the image sensor 61.

As described above, in a case where the riding state of the occupant is not determinable with high accuracy on the basis of the normal captured image when collision of the automobile 1 is predicted before detection of the collision of the automobile 1, the occupant monitoring ECU 34 may switch the imaging range (angle of view) of the captured image to be outputted from the vehicle interior imaging device 31 to a narrower imaging range.

In step ST7, the occupant monitoring ECU 34 may acquire the captured image of the upper body imaging range A2 outputted from the vehicle interior imaging device 31. The occupant monitoring ECU 34 may also extract, from the captured upper body image, the upper body and the head of the driver riding in the automobile 1. On the basis of imaging positions and ranges, for example, of the upper body and the head in the upper body imaging range A2, the occupant monitoring ECU 34 may determine a position and an orientation of the upper body and a position and an orientation of the head of the driver in the cabin 3.

In step ST8, the occupant monitoring ECU 34 may determine whether the positions and the orientations of the upper body and the head of the driver are determinable with high accuracy on the basis of the latest captured upper body image. The imaging range may be narrower than that in step ST5. This makes the sun less likely to appear in the image. Moreover, even if the upper body and the head of the driver are irradiated with strong light, a difference in image quality, such as a difference in luminance, in the entire image considering influence of the irradiation is smaller. The upper body and the head of the driver are likely to appear in the image more clearly than in step ST5.

The occupant monitoring ECU 34 may perform edge detection on the latest captured upper body image, for example, and attempt to extract predetermined features, e.g., an outline of a face, an eye, a nose, a mouth, and a shoulder, in the image of the upper body imaging range A2 after the edge detection. In a case where the head is clearly visible in the image, it is possible to extract predetermined features of the face in the image after the edge detection. In this case, the occupant monitoring ECU 34 may determine that the positions and the orientations of the upper body and the head of the driver are determinable with high accuracy on the basis of the captured upper body image (step ST8: Y), and advance the process to step ST18. In a case where the positions and the orientations are not determinable with high accuracy (step ST8: N), the occupant monitoring ECU 34 may advance the process to step ST9.

In step ST9, the occupant monitoring ECU 34 may set, in the setting memory 63, imaging in the head imaging range A3 serving as the third imaging range. Thus, the vehicle interior imaging device 31 may start to output the captured image of the head imaging range A3 that is obtained by performing imaging on the entire head of the driver riding in the automobile 1. The vehicle interior imaging device 31 may start to output, at the normal frame rate, the captured image of the head imaging range A3 derived from some of the pixels of the image sensor 61.

As described above, in a case where the riding state of the occupant is not determinable with high accuracy on the basis of the normal captured image and the captured upper body image when collision of the automobile 1 is predicted before detection of the collision of the automobile 1, the occupant monitoring ECU 34 may switch the imaging range (angle of view) of the captured image to be outputted from the vehicle interior imaging device 31 to an even narrower imaging range.

In step ST10, the occupant monitoring ECU 34 may acquire the captured image of the head imaging range A3 outputted from the vehicle interior imaging device 31. The occupant monitoring ECU 34 may also extract, from the captured head image, the head of the driver riding in the automobile 1. On the basis of imaging position and range, for example, of the head in the head imaging range A3, the occupant monitoring ECU 34 may determine a position and an orientation of the head of the driver in the cabin 3.

In step ST11, the occupant monitoring ECU 34 may determine whether the position and the orientation of the head of the driver are determinable with high accuracy on the basis of the latest captured head image. The imaging range may be narrower than that in step ST5 or step ST8. This makes the sun less likely to appear in the image. Moreover, even if the upper body and the head of the driver are irradiated with strong light, a difference in image quality, such as a difference in luminance, in the entire image considering influence of the irradiation is smaller. The head of the driver is likely to appear in the image more clearly than in step ST5 or step ST8.

The occupant monitoring ECU 34 may perform edge detection on the latest captured head image, for example, and attempt to extract predetermined features, e.g., an outline of a face, an eye, a nose, and a mouth, in the image of the head imaging range A3 after the edge detection. In a case where the head is clearly visible in the image, it is possible to extract predetermined features of the face in the image after the edge detection. In this case, the occupant monitoring ECU 34 may determine that the position and the orientation of the head of the driver are determinable with high accuracy on the basis of the captured head image, for example (step ST11: Y), and advance the process to step ST18. In a case where the position and the orientation are not determinable with high accuracy (step ST11: N), the occupant monitoring ECU 34 may advance the process to step ST12.

In step ST12, the occupant monitoring ECU 34 may set imaging for each of a plurality of small ranges A4 in the setting memory 63. This imaging may be performed by dividing the head imaging range A3 into the small ranges A4. In one example, the occupant monitoring ECU 34 may set the imaging range for each time to a minimum range that is settable in the vehicle interior imaging device 31. Moreover, the occupant monitoring ECU 34 may raise the output frame rate in outputting captured images from the vehicle interior imaging device 31 to a maximum output frame rate that is settable in the vehicle interior imaging device 31. Thus, the vehicle interior imaging device 31 may start to output a small image obtained by imaging the head imaging range A3 for each small range A4. The vehicle interior imaging device 31 may start to output, at high speed at the maximum frame rate, a captured image obtained by imaging the head imaging range A3 for each small range A4.

In step ST13, the occupant monitoring ECU 34 may acquire, from the vehicle interior imaging device 31, the small image obtained by imaging the head imaging range A3 for each small range A4.

In step ST14, the occupant monitoring ECU 34 may determine whether a set of small images for the head imaging range A3 has been acquired. In a case where it is determined that the set of small images has not been acquired (step ST14: N), the occupant monitoring ECU 34 may return the process to step ST13. The occupant monitoring ECU 34 may repeat the processes in step ST13 and step ST14, until acquisition of the set of small images for the head imaging range A3 is completed. In a case where it is determined that the set of small images for the head imaging range A3 has been acquired (step ST14: Y), the occupant monitoring ECU 34 may advance the process to step ST15.

In step ST15, the occupant monitoring ECU 34 may combine the acquired set of small images for the head imaging range A3, to generate an image of the head imaging range A3. For example, the occupant monitoring ECU 34 may execute edge detection for each small image, and combine the small images after the edge detection to generate an edge image of the head imaging range A3. Performing the edge detection for each small image enables features of the head, which are included in each image, to remain more easily in the edge image. Moreover, combining the edge images suppresses a difference in image quality in the original image, which makes it easier to obtain the features of the head continuously at joints between the edge images. This enables the features of the head to be obtained more easily in the entire composite image.

In step ST16, the occupant monitoring ECU 34 may determine whether the position and the orientation of the head of the driver are determinable with high accuracy on the basis of the captured head image obtained by the combination. In an image that is obtained by performing the edge detection for each small image and combining the small images, edge components corresponding to features of the face are more likely to remain than in an image that is obtained by performing the edge detection on the entire captured head image. The features of the head of the driver are likely to appear in the image more clearly than in step ST10.

The occupant monitoring ECU 34 may, for example, attempt to extract predetermined features, e.g., an outline of a face, an eye, a nose, and a mouth, in the composite image that has been subjected to the edge detection. In a case where the head is clearly visible in the image, it is possible to extract predetermined features of the face in the image after the edge detection. In this case, the occupant monitoring ECU 34 may determine that the position and the orientation of the head of the driver are determinable with high accuracy on the basis of the captured head image, for example (step ST16: Y), and advance the process to step ST17. In a case where the position and the orientation are not determinable with high accuracy (step ST16: N), the occupant monitoring ECU 34 may advance the process to step ST19.

In step ST17, the occupant monitoring ECU 34 may execute division imaging for the upper body imaging range A2. The occupant monitoring ECU 34 may set imaging of the upper body imaging range A2 in the setting memory 63, and acquire, from the vehicle interior imaging device 31, a plurality of small images that has been captured by dividing the captured upper body image into a plurality of pieces. The occupant monitoring ECU 34 may perform the edge detection on the small images and thereafter combine the small images to acquire a captured upper body image of the driver. On the basis of the captured upper body image of the driver obtained by the combination, the occupant monitoring ECU 34 may determine the position and the orientation of the upper body of the driver on the basis of features, such as the shoulder, of the driver.

In step ST18, the occupant monitoring ECU 34 may output, to the in-vehicle network 44, information of the riding state of the driver, including the position and the orientation of the upper body and the position and the orientation of the head of the driver, which have been determined with high accuracy. The occupant protection ECU 11 may acquire the information of the riding state of the driver determined with high accuracy, and record the information in the protection memory 12 as setting data of the occupant information. Upon detection of collision thereafter, the occupant protection ECU 11 may execute protection control for the occupant, on the basis of the setting data in the protection memory 12. On the basis of the occupant information of the riding state of the driver determined with high accuracy, it is possible for the occupant protection ECU 11 to execute optimum occupant protection corresponding to the riding state of the occupant at the time of the collision, in accordance with a wide variety of collision types.

In step ST19, the occupant monitoring ECU 34 may determine whether remaining time before the collision is left. The remaining time may be, for example, time from the current time to timing at which the collision is expected to occur. The current time may be measured by the system timer 35. In a case where the remaining time is equal to or greater than time desired for the processes from step ST13 to step ST17, for example, the occupant monitoring ECU 34 may determine that the remaining time before the collision is left (step ST19: Y), and return the process to step ST13. In this case, until the remaining time before the collision becomes insufficient, the occupant monitoring ECU 34 may repeatedly execute the processes from step ST13 to step ST17, and attempt to determine the position and the orientation of the head of the driver with high accuracy. In a case where there is remaining time before the occupant protection ECU 11 executes occupant protection control based on the detection of the collision of the automobile 1, the occupant monitoring ECU 34 may repeat the process of causing the vehicle interior imaging device 31 to perform imaging by dividing the head imaging range A3 into a plurality of ranges. In a case where the remaining time is insufficient (step ST19: N), the occupant monitoring ECU 34 may advance the process to step ST20.

In step ST20, the occupant monitoring ECU 34 may output minimum information of the riding state of the driver to the in-vehicle network 44, because the riding state of the driver is not determinable with high accuracy. The occupant protection ECU 11 may acquire such simple information of the riding state of the driver, and record the information in the protection memory 12 as setting data of the occupant information. Upon detection of collision thereafter, the occupant protection ECU 11 may execute normal protection control for the occupant, on the basis of the setting data in the protection memory 12. The occupant protection ECU 11 may execute general occupant protection corresponding to the collision type alone, without using the riding state of the driver, for example.

Figure 7A:
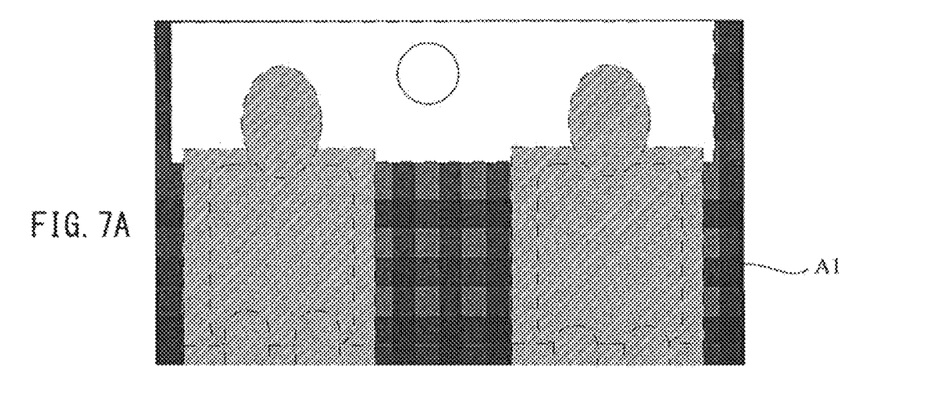
FIGS. 7A to 7C are explanatory diagrams illustrating a case where the sun appears in a normal captured image of the vehicle interior imaging device.
Figure 7B:
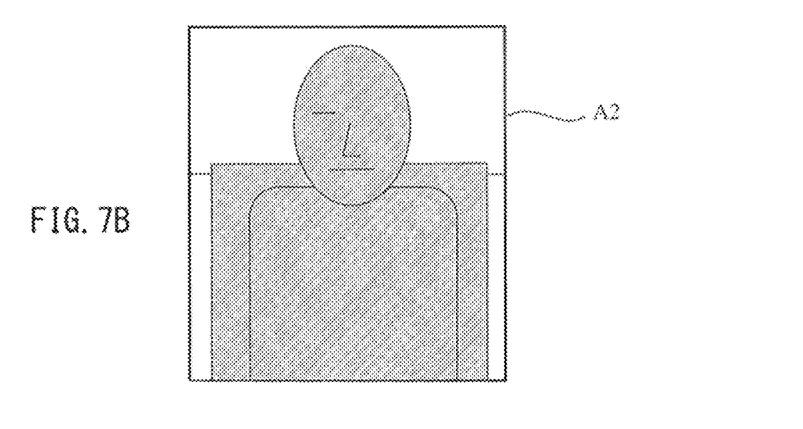
Figure 7C:
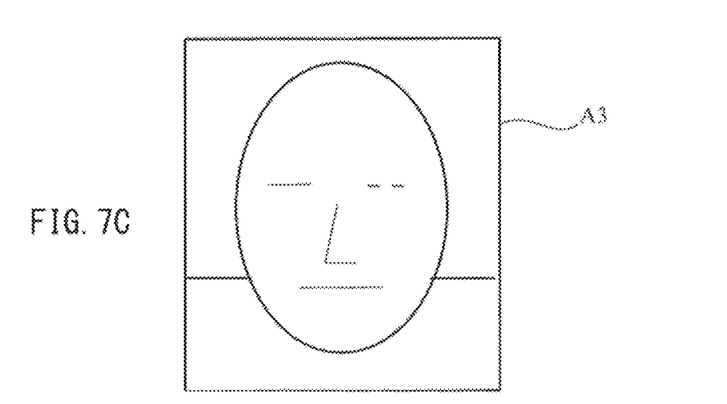

FIGS. 7A to 7C are explanatory diagrams illustrating a case where the sun appears in a normal captured image of the vehicle interior imaging device 31.

FIG. 7A illustrates the normal captured image. FIG. 7B illustrates a captured upper body image of the driver. FIG. 7C illustrates a captured head image of the driver.

In the imaging environment illustrated in FIGS. 7A to 7C, the sun appears in the normal captured image.

In this case, in regard to the captured image of the normal imaging range A1 in FIG. 7A, the vehicle interior imaging device 31 may correct the image quality to lower the luminance of the entire image, to enable luminance to be obtained for the vehicle exterior including the sun. Consequently, the upper body and the head of the occupant, such as the driver, present in the vehicle interior may appear dark, preventing determination of the position or the orientation of the upper body and the head. In the determination in step ST5, the occupant monitoring ECU 34 may determine that high-accuracy determination is not possible for the normal captured image.

The sun is not appearing in the captured image of the upper body imaging range A2 in FIG. 7B. In this case, the vehicle interior imaging device 31 may correct the image quality such as the luminance of the entire image, to enable luminance to be obtained for backlight and the vehicle interior. Consequently, the upper body and the head of the occupant, such as the driver, present in the vehicle interior may appear brighter than those in the normal captured image in FIG. 7A. In the determination in step ST8, the occupant monitoring ECU 34 may determine that high-accuracy determination is possible for the captured upper body image in some cases. Actually, in the captured upper body image in FIG. 7B, features, including the nose and the mouth, of the head of the driver are visible in the image, unlike in the normal captured image in FIG. 7A.

In a case where, however, high-accuracy determination is not possible even for the captured upper body image, the vehicle interior imaging device 31 may capture the captured head image in FIG. 7C. In this case, only the vehicle interior, such as the head of the occupant, is basically visible in the image. Accordingly, the vehicle interior imaging device 31 may correct the image quality to raise the luminance of the entire image, to remove influence of the backlight. Consequently, in the captured head image in FIG. 7C, features, including the eye, the nose, and the mouth, of the head of the driver appear in the image more clearly than in the captured upper body image in FIG. 7B. In this case, in the determination in step ST11, it is possible for the occupant monitoring ECU 34 to determine that high-accuracy determination is possible for the captured head image.

Figure 8A:
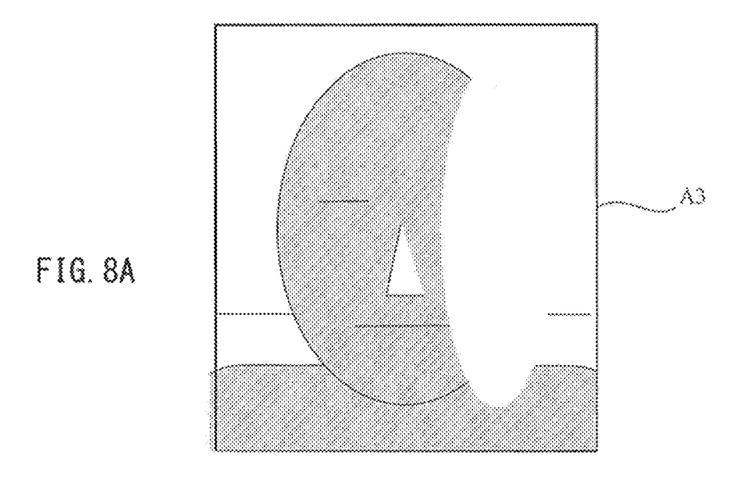
FIGS. 8A and 8B are explanatory diagrams illustrating a case where the head is partially invisible in a captured head image of a driver.
Figure 8B:
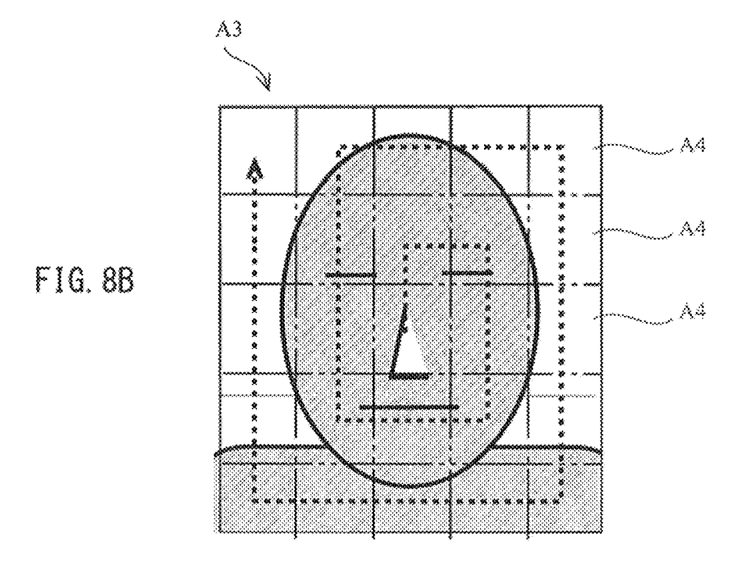

FIGS. 8A and 8B are explanatory diagrams illustrating a case where the head is partially invisible in a captured head image of the driver.

FIG. 8A illustrates the captured head image of the driver obtained in step ST9.

FIG. 8B illustrates the composite image of the small images obtained by the division imaging in step ST12.

In the imaging environment illustrated in FIGS. 8A and 8B, the right half of the head of the driver is irradiated with strong light from the sun, for example.

In this case, the vehicle interior imaging device 31 may correct the image quality to lower the luminance of the entire image in the captured head image in FIG. 8A, to enable luminance to be obtained for the right half of the head. Consequently, the rest of the head of the occupant, such as the driver, present in the vehicle interior may appear dark, preventing determination of the position or the orientation of the rest of the head. In the determination in step ST11, the occupant monitoring ECU 34 may determine that high-accuracy determination is not possible for the captured head image.

Furthermore, the vehicle interior imaging device 31 may perform imaging by dividing the captured head image into the small ranges A4 as in FIG. 8B, on the basis of an instruction from the occupant monitoring ECU 34. In the example illustrated in FIG. 8B, the vehicle interior imaging device 31 may first image the small range A4 in the middle of the captured head image, and thereafter image the surrounding small ranges A4 clockwise in order from the inner side to the outer side. Upon acquisition of the image of the last small range A4 at the upper left, the occupant monitoring ECU 34 may execute image combination.

Thus, in the composite image in FIG. 8B, features, including the eye, the nose, and the mouth, of the head of the driver appear in the image more clearly than in the captured head image in FIG. 8A. In this case, in the determination in step ST16, it is possible for the occupant monitoring ECU 34 to determine that high-accuracy determination is possible for the composite image.

As illustrated in FIGS. 7A to 7C and FIGS. 8A and 8B, the imaging range partially being bright, for example, may cause the upper body or the head, for example, of the driver in the normal captured image to exhibit over-exposure or under-exposure. Even in such a case, the occupant monitoring ECU 34 may narrow the imaging range and acquire a captured image, making it possible to determine the riding state of the occupant with high accuracy on the basis of the captured image of the narrowed range. It is also possible for the occupant protection ECU 11 to execute optimum occupant protection control corresponding to the riding state of the occupant, on the basis of the high-accuracy determination result regarding the riding state of the occupant.

As described above, in some example embodiments, the riding state, e.g., position, orientation, or posture, of the upper body or the head of the occupant in the automobile 1 may be undeterminable on the basis of the captured image outputted from the vehicle interior imaging device 31. In that case, the occupant monitoring apparatus 33 may switch an imaging range (angle of view) of the captured image to be outputted from the vehicle interior imaging device 31 to an imaging range that is narrower than the imaging range of the captured image on the basis of which the riding state has been undeterminable. Switching the imaging range to a narrower imaging range makes it difficult for the captured image to include anything other than the occupant. This helps to appropriately capture an image of the occupant riding in the automobile 1 by the vehicle interior imaging device 31. Consequently, it is possible for the occupant monitoring apparatus 33 to determine the riding state of the upper body or the head of the occupant in the automobile 1 on the basis of the captured image after the switching. It is also possible for the occupant protection apparatus 10 to appropriately execute protection control corresponding to the occupant riding in the automobile 1, on the basis of the monitoring result of the occupant monitoring apparatus 33 obtained by determining the riding state in the automobile 1 more accurately.

In the automobile 1, the vehicle interior imaging device 31 that captures an image of the occupant may basically be installed at fixed position and orientation in the vehicle interior. Therefore, the entire image can exhibit over-exposure in a case where the imaging range includes sunrise or sunset, for example. In a case where the entire image exhibits over-exposure, it is difficult to accurately determine, on the basis of the captured image, the riding state of the upper body or the head of the occupant in the automobile 1. In this case, protection control for the occupant may be executed on the basis of inaccurate determination, which makes it likely that appropriate protection control is not executable for the occupant riding in the automobile 1.

In contrast, in the example embodiment, in a case where the riding state of the upper body or the head of the occupant in the automobile 1 is undeterminable on the basis of the captured image outputted from the vehicle interior imaging device 31, the imaging range of the captured image to be outputted from the vehicle interior imaging device 31 is switched. For example, in the case where the riding state of the upper body or the head of the occupant in the automobile 1 is undeterminable on the basis of the captured image outputted from the vehicle interior imaging device 31, the imaging range of the captured image to be outputted from the vehicle interior imaging device 31 may be switched to an imaging range that is narrower than the imaging range of the captured image on the basis of which the riding state has been undeterminable. Thus, even if the vehicle interior imaging device 31 that captures an image of the occupant is installed at fixed position and orientation in the vehicle interior, it is possible for the occupant monitoring apparatus 33 to accurately determine the riding state of the upper body or the head of the occupant in the automobile 1 on the basis of the captured image after the switching, which includes no sunrise or sunset, for example. It is possible to execute protection control for the occupant on the basis of accurate determination, which makes it possible to appropriately execute protection control for the occupant riding in the automobile 1. By using the occupant monitoring apparatus 33 according to the example embodiment, it is possible for the occupant protection apparatus 10 to execute occupant protection suitable for the riding state of the occupant at the time of collision, for example, in accordance with a wide variety of collision types.

For example, in some example embodiments, the vehicle interior imaging device 31 itself may evaluate the captured image, correct the image quality, such as the exposure, and output the corrected captured image. If strong light such as sunlight is reflected by the head or the upper body of the occupant, for example, the vehicle interior imaging device 31 may correct the captured image to suppress the image quality, such as the exposure, of the entire captured image, to enable an image of the brightest area to be obtained. For example, the entire image may be made dark to allow only a glass part of glasses to exhibit proper exposure. If a portion other than a high luminance area thus becomes dark in the captured image, it is difficult for the occupant monitoring apparatus 33 to accurately determine the position or the orientation of the head or the upper body of the occupant in the captured image. In some example embodiments, in a case where the vehicle interior imaging device 31 executes such correction, the imaging range of the captured image to be outputted from the vehicle interior imaging device 31 may be switched to a narrower imaging range. Switching the imaging range of the captured image to a narrower imaging range is expected to reduce a difference in image quality, for example, a difference in luminance, between the high luminance area and the portion other than the high luminance area in the captured image. This makes it difficult for the portion other than the high luminance area to become dark. It is thus possible for the occupant monitoring apparatus 33 to determine the position or the orientation of the head or the upper body of the occupant, on the basis of an image of the portion other than the high luminance area.

The example embodiments described above are examples of embodiments of the technology. The technology is not limited to these example embodiments, and various kinds of modifications or variations may be made without departing from the scope of the technology.

For example, in some example embodiments, in a case where the riding state of the occupant is not determinable with high accuracy in the normal captured image, the occupant monitoring ECU 34 may switch the imaging range of the vehicle interior imaging device 31 from the normal imaging range A1 to the upper body imaging range A2 including the head, and further from the upper body imaging range A2 to the head imaging range A3, to narrow the imaging range in order in three levels.

As another example, the occupant monitoring ECU 34 may switch the imaging range of the vehicle interior imaging device 31 to narrow the imaging range in two levels or to narrow the imaging range in four or more levels.

For example, the occupant monitoring ECU 34 may switch the imaging range of the normal captured image to the head imaging range A3 in two levels. Alternatively, the occupant monitoring ECU 34 may only switch the imaging range of the normal captured image to the upper body imaging range A2 in two levels.

In some example embodiments, the occupant monitoring ECU 34 may perform imaging of the head imaging range A3 by dividing the imaging range into the small ranges A4.

As another example, the occupant monitoring ECU 34 may perform imaging of the upper body imaging range A2 by dividing the imaging range into the small ranges A4.

In some example embodiments, in a case of imaging the head imaging range A3 by dividing the imaging range into the small ranges A4, the occupant monitoring ECU 34 may raise the output frame rate from the vehicle interior imaging device 31 from the normal frame rate to the maximum frame rate.

As another example, the occupant monitoring ECU 34 may raise the output frame rate from the vehicle interior imaging device 31 to the maximum frame rate also in a case of imaging the upper body imaging range A2 or in a case of imaging the head imaging range A3. Moreover, the occupant monitoring ECU 34 may raise the output frame rate to the maximum frame rate upon prediction of collision.

In some example embodiments, the occupant monitoring ECU 34 may output information of the riding state of the occupant for optimum protection only in a case where high-accuracy determination is possible in captured images including the composite image.

As another example, even in a case where high-accuracy determination is not possible in captured images including the composite image, the occupant monitoring ECU 34 may output, instead of information of the riding state of the occupant for normal protection, maximum determinable information of the riding state of the occupant.

The occupant protection ECU 11 and the occupant monitoring ECU 34 illustrated in FIG. 4 are implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the occupant protection ECU 11 and the occupant monitoring ECU 34. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and an SRAM, and the nonvolatile memory may include a ROM and an NVRAM. The ASIC is an integrated circuit (IC) customized to perform, and the FPGA is an integrated circuit designed to be configured after manufacturing in order to perform, all or a part of the functions of the occupant protection ECU 11 and the occupant monitoring ECU 34 illustrated in FIG. 4.

The invention claimed is:

1. A vehicle occupant protection system comprising:
   an imaging device configured to capture an image of an occupant riding in a vehicle;
   an occupant monitoring apparatus configured to monitor the occupant on a basis of the captured image outputted from the imaging device, and configured to, in a case where a riding state of the occupant in the vehicle is undeterminable on the basis of the captured image outputted from the imaging device, switch an imaging range of the captured image to be outputted from the imaging device, wherein
   the occupant monitoring apparatus is configured to, in a case where the riding state of the occupant in the vehicle is undeterminable on a basis of a first captured image that is outputted from the imaging device upon prediction of collision of the vehicle, switch the captured image to be outputted from the imaging device, by causing the imaging device to image a second imaging range narrower than a first imaging range of the first captured image; and
   an occupant protection apparatus configured to execute, on a basis of the monitoring by the occupant monitoring apparatus, protection control that is based on the occupant riding in the vehicle.

2. The vehicle occupant protection system according to claim 1, wherein the occupant monitoring apparatus is configured to, in the case where the riding state of the occupant in the vehicle is undeterminable on the basis of the captured image outputted from the imaging device, switch the imaging range of the captured image to be outputted from the imaging device to an imaging range that is narrower than the imaging range of the captured image on the basis of which the riding state has been undeterminable.

3. The vehicle occupant protection system according to claim 1, wherein the imaging device includes:
   an image sensor configured to capture an image of the occupant riding in the vehicle;
   a generator configured to generate an image designated by the occupant monitoring apparatus from the captured image of the image sensor;
   an evaluator configured to evaluate image quality of the image generated by the generator on a basis of the entire image;
   a corrector configured to correct the image generated by the generator on a basis of the evaluation by the evaluator; and
   an output unit configured to output the image corrected by the corrector as the captured image to be outputted from the imaging device.

4. The vehicle occupant protection system according to claim 2, wherein the imaging device includes:
   an image sensor configured to capture an image of the occupant riding in the vehicle;
   a generator configured to generate an image designated by the occupant monitoring apparatus from the captured image of the image sensor;
   an evaluator configured to evaluate image quality of the image generated by the generator on a basis of the entire image;
   a corrector configured to correct the image generated by the generator on a basis of the evaluation by the evaluator; and
   an output unit configured to output the image corrected by the corrector as the captured image to be outputted from the imaging device.

5. The vehicle occupant protection system according to claim 2, wherein the occupant monitoring apparatus is configured to, in a case where the riding state of the occupant in the vehicle is undeterminable on a basis of a first captured image that is outputted from the imaging device upon prediction of collision of the vehicle, switch the captured image to be outputted from the imaging device, by causing the imaging device to image a second imaging range narrower than a first imaging range of the first captured image.

6. The vehicle occupant protection system according to claim 1, wherein the occupant monitoring apparatus is configured to, in a case where the riding state of the occupant in the vehicle is undeterminable on a basis of a second captured image of the second imaging range that is outputted from the imaging device, switch the captured image to be outputted from the imaging device, by causing the imaging device to image a third imaging range narrower than the second imaging range.

7. The vehicle occupant protection system according to claim 5, wherein the occupant monitoring apparatus is configured to, in a case where the riding state of the occupant in the vehicle is undeterminable on a basis of a second captured image of the second imaging range that is outputted from the imaging device, switch the captured image to be outputted from the imaging device, by causing the imaging device to image a third imaging range narrower than the second imaging range.

8. The vehicle occupant protection system according to claim 6, wherein the occupant monitoring apparatus is configured to, in a case where the riding state of the occupant in the vehicle is undeterminable on a basis of a third captured image of the third imaging range that is outputted from the imaging device, switch the captured image to be outputted from the imaging device, by causing the imaging device to image the third imaging range by dividing the third imaging range into a plurality of ranges.

9. The vehicle occupant protection system according to claim 7, wherein the occupant monitoring apparatus is configured to, in a case where the riding state of the occupant in the vehicle is undeterminable on a basis of a third captured image of the third imaging range that is outputted from the imaging device, switch the captured image to be outputted from the imaging device, by causing the imaging device to image the third imaging range by dividing the third imaging range into a plurality of ranges.

10. The vehicle occupant protection system according to claim 8, wherein the occupant monitoring apparatus is configured to, in a case where there is time before the occupant protection apparatus executes protection control for the occupant on a basis of detection of the collision of the vehicle, repeat a process of causing the imaging device to image the third imaging range by dividing the third imaging range into the plurality of ranges.

11. The vehicle occupant protection system according to claim 9, wherein the occupant monitoring apparatus is configured to, in a case where there is time before the occupant protection apparatus executes protection control for the occupant on a basis of detection of the collision of the vehicle, repeat a process of causing the imaging device to image the third imaging range by dividing the third imaging range into the plurality of ranges.

12. The vehicle occupant protection system according to claim 1, wherein the occupant monitoring apparatus is configured to, in switching the imaging range of the captured image to be outputted from the imaging device to a narrower imaging range, raise an output frame rate at which the imaging device outputs the captured image.

13. The vehicle occupant protection system according to claim 2, wherein the occupant monitoring apparatus is configured to, in switching the imaging range of the captured image to be outputted from the imaging device to a narrower imaging range, raise an output frame rate at which the imaging device outputs the captured image.

* * * * *